Nov. 14, 1944.   H. P. SMITH   2,362,728
AGRICULTURAL IMPLEMENT
Filed May 18, 1942   3 Sheets-Sheet 3
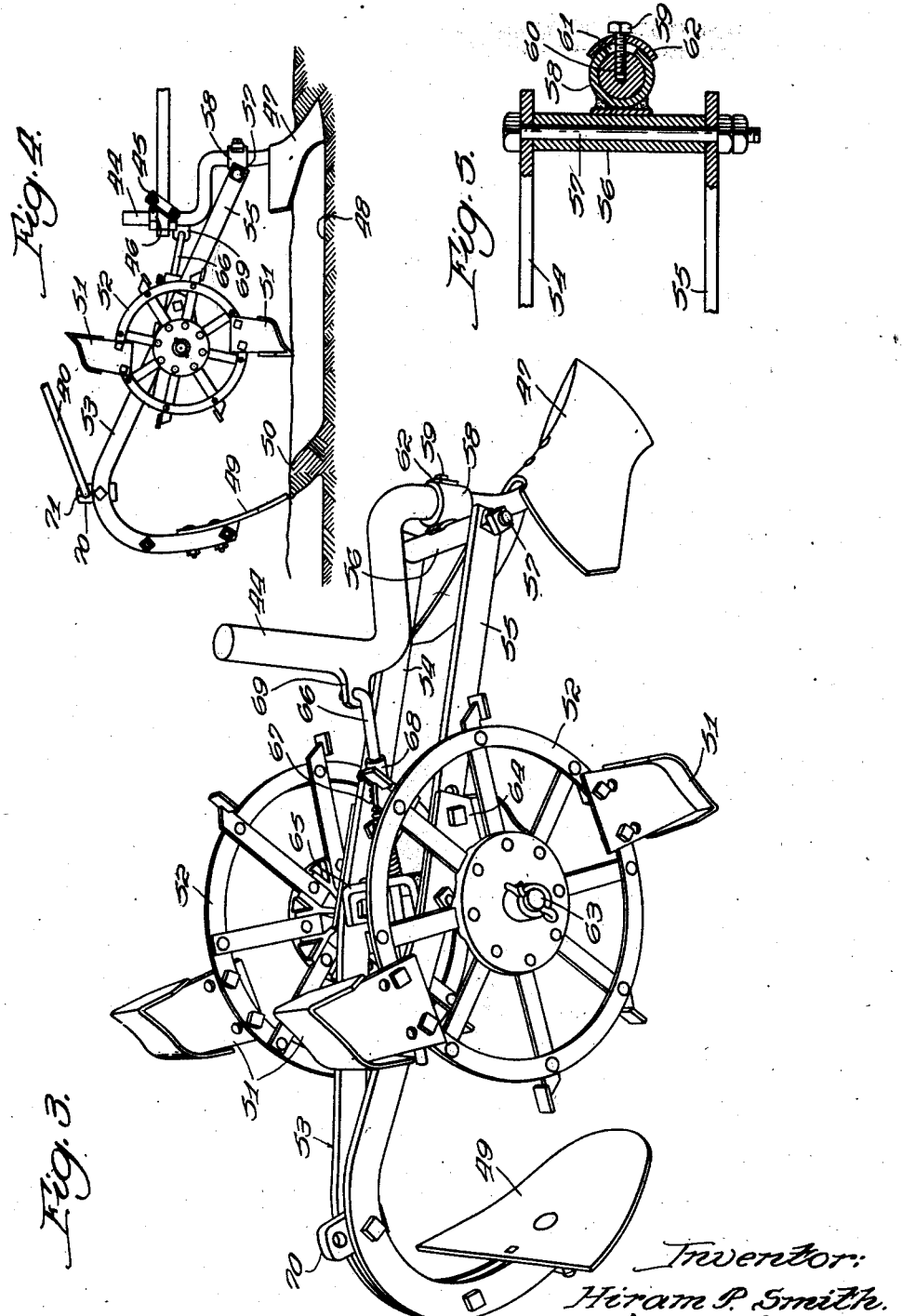

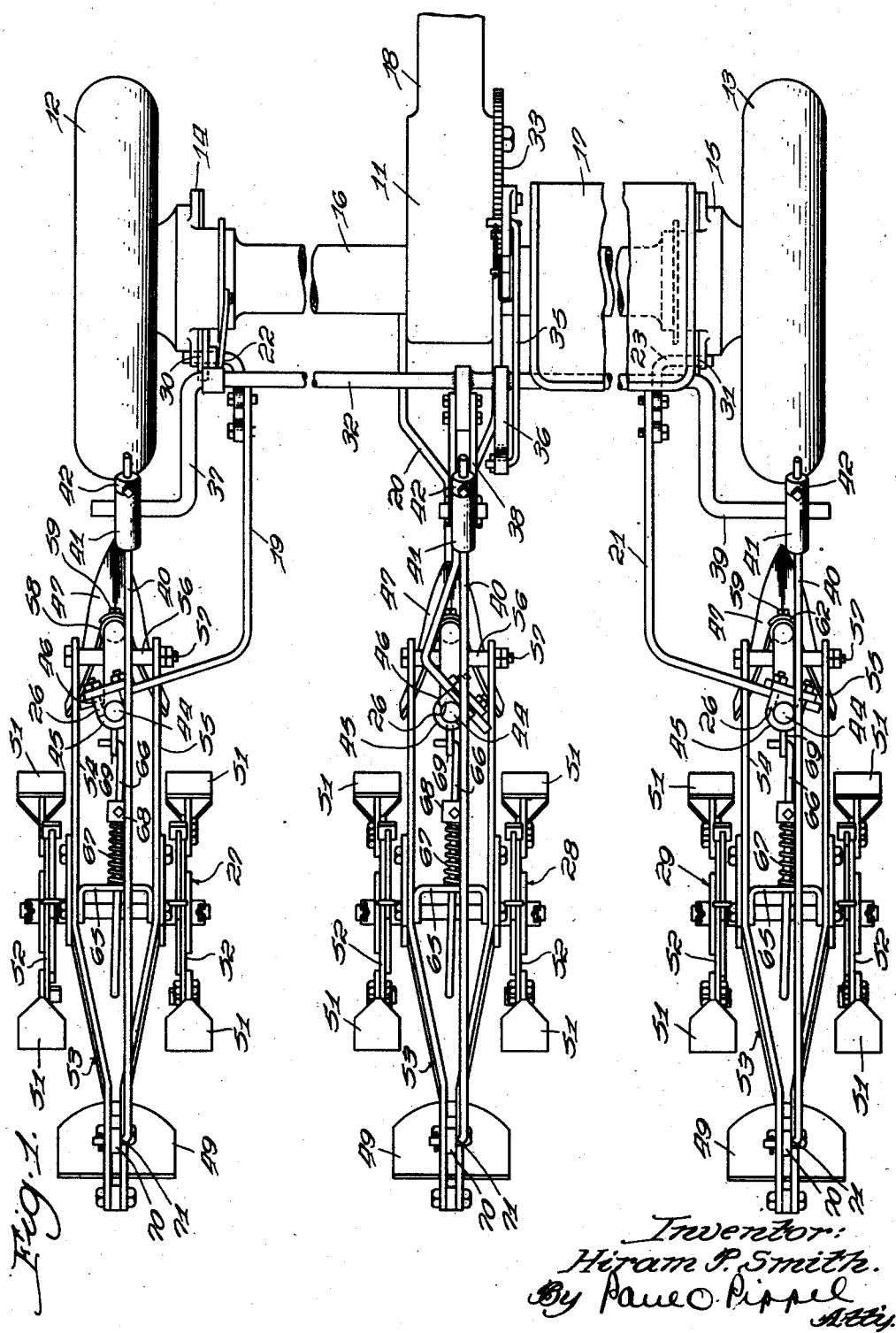

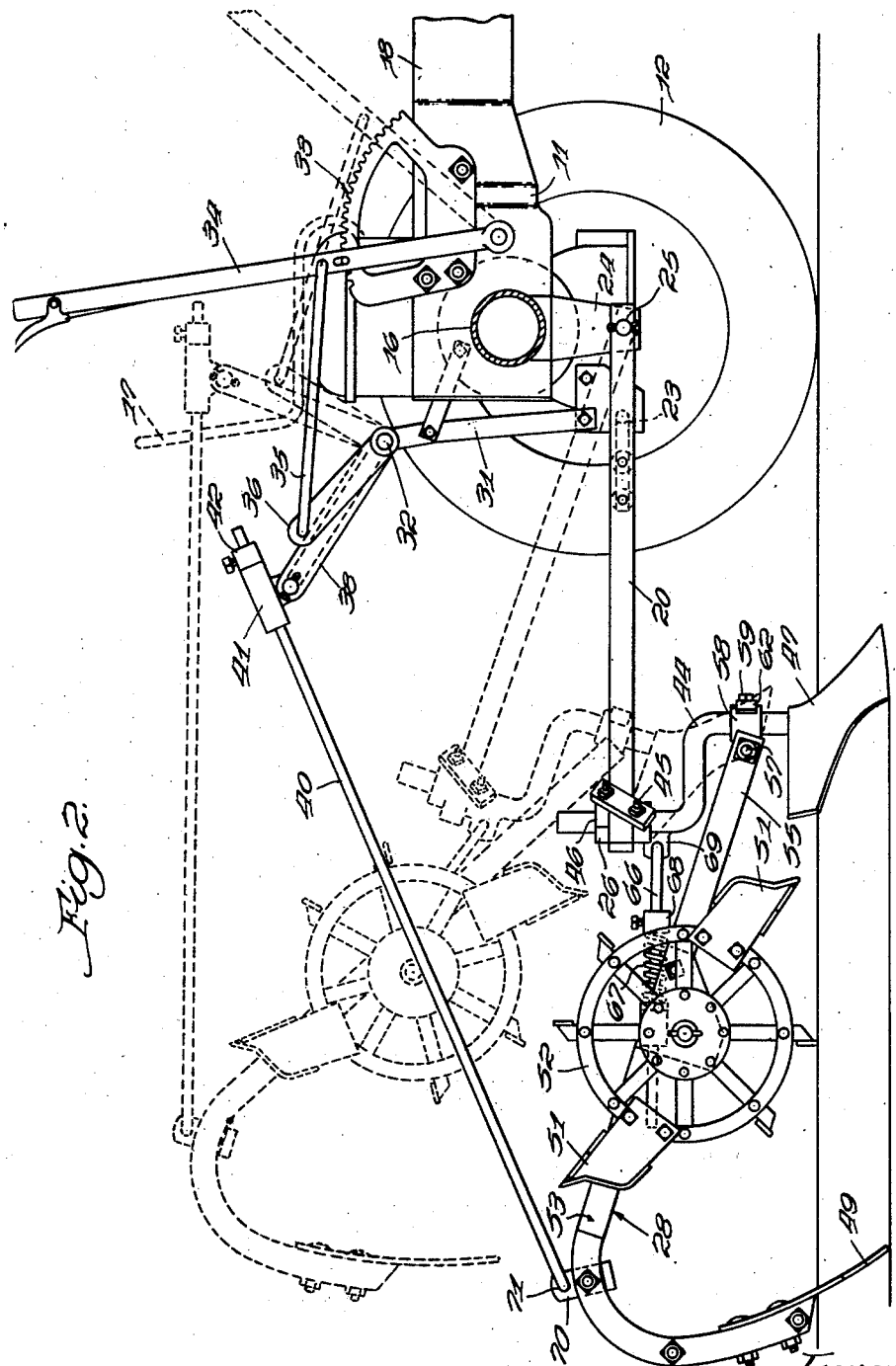

Patented Nov. 14, 1944

2,362,728

UNITED STATES PATENT OFFICE 2,362,728

AGRICULTURAL IMPLEMENT

Hiram P. Smith, Canton, Ill., assignor to International Harvester Company, a corporation of New Jersey Application May 18, 1942, Serial No. 443,351

1 Claim. (Cl. 97—55)

This invention relates to agricultural implements and, more particularly, to devices forming dams in furrows, whereby water will be collected and retained on cultivated land in order to provide adequate moisture for the proper growing of row crops.

Various damming and basin-forming devices have been used heretofore in the preparation of land prior to the planting and at the time of planting of the same, in order to insure adequate water supply to the land for the proper starting of the row crop. But, during cultivation with the regular cultivating equipment, these basins are obliterated and consequently the water resulting from the early summer rains immediately runs off. It is during the initial growing period of the row crop when it is most desirable that water be retained and that the running-off be at a minimum.

It is, therefore, the object of the present invention to provide an arrangement adapted for attachment to the tractor cultivating equipment, whereby water basins may be provided in the ground during the time at which the row crop is cultivated.

It is another object of the present invention to provide a dam-forming device which is self-contained and which can be readily attached as a unit to the regular cultivator rig by the same means as the cultivating tool is attached to the cultivating rig, or, in other words, a device which may readily and easily replace the cultivating tool on the cultivating rig.

It is still another object of the invention to provide in a self-contained furrowing and damming unit, means for the attachment of the damming unit to a vertically extending standard whereby limited lateral movement of the damming tool following in the furrow formed by the furrowing tool may be had.

According to the present invention, there has been provided a dam-forming attachment which can be used at the time of cultivation of the row crop and which is attachable as a unit to a regular cultivator rig by the same means as the standard cultivating tool is connected to the cultivating rig. When this device is attached to the cultivating rig, the same can be raised and lowered with the cultivating rig, the same way that the cultivating rig with its cultivating tool is raised and lowered. These units are attached to the cultivating rigs which extend from the rear portion of the tractor rearwardly to locations in rear of the traction wheels of the tractor, whereby the units, in addition to forming dams within a furrow, will at the same time wipe out the tracks left by the traction wheels. These units, including both their furrowing and damming tools, are attachable to the cultivator rigs by their single vertically extending attaching standard arranged to fit within the attaching means regularly used for attaching the cultivating tool to the cultivating rig. The damming element is so connected to the unit standard that it may have limited lateral movement with respect to the same and thereby readily follow in the furrow formed by the furrowing tool.

For other objects and for a better understanding of the invention, reference may be had to the following detailed description taken in connection with the accompanying drawings, in which:

Figure 1 is a plan view of the rear portion of a tractor with a cultivator rig having a self-contained damming unit connected thereto;

Figure 2 is a view in elevation of the rear portion of the tractor and of the damming units and showing the units in both their ground-working and transport positions.

Figure 3 is a perspective view of the individual self-contained unit;

Figure 4 is a fragmentary view of Figure 1 and illustrates the operation of the damming element as it passes over the dammed earth which it has previously formed; and Figure 5 is a detail view in section, showing the connection of the damming element to the standard.

Referring now to the drawings, there is shown a rear portion 11 of a tractor supported on rear traction wheels 12 and 13, carried respectively on depending housings 14 and 15 of a generally transversely extending rear axle structure 16. On the rear axle structure 16 is an operator's station 17 located to the right of a centrally alined, longitudinally extending body portion 18. This tractor is preferably of the tricycle type having its forward end supported on dirigible wheels in a manner well known in the art. To this forward portion of the tractor may be regularly attached the forward cultivating equipment used for straddling the crop rows to effect cultivation upon the same. Also forming a part of the tractor equipped for cultivation are the regular cultivating rigs 19, 20, and 21. During cultivation, these cultivating rigs carry cultivating shovels, and the rigs themselves are so arranged as to have these shovels located in longitudinal alinement with the supporting wheels of the tractor.

The cultivating rigs 19 and 21 are respectively pivotally connected, as indicated at 22 and 23, to the depending axle housings 14 and 15. The rig 20 is disposed intermediate of the rigs 19 and 21 and is pivotally connected to downwardly extending brackets 24 on the rear axle structure, as indicated at 25 on the rear axle structure 16, and in alinement with the longitudinal body portion 18 of the tractor.

The cultivating tools, normally located in rear of the tractor, are mainly for the purpose of wiping out the tracks left by the wheels of the tractor. The major portion of the cultivating is done by the implements located on the forward portion of the tractor. However, to a certain extent and for the purpose of effecting a complete cultivating job, the tools located at the rear of the tractor are considered as a part of the regular cultivating equipment as much as the cultivating tools located on the forward portion of the tractor. Each of these rigs has a means 26 serving to connect to the main portion of the rigs the standards bearing the rig cultivating tools.

To equip the tractor and its cultivating equipment with the self-contained damming units, the regular cultivating tool standards, with their tools, are removed from the rigs, and the self-contained units 27, 28, and 29 are respectively connected by the cultivator standard attaching means 26 to the respective cultivating rigs 19, 20, and 21. It will thus be noted that these units replace the cultivating standards which are normally contained on the cultivating rigs.

Provided on the rear axle structure 16 and located respectively at the sides of the same are the vertically extending brackets 30 and 31, which serve as a support for a lifting rock-shaft 32 adapted to be rocked by means of a manually adjustable mechanism 33 located on the longitudinally extending portion 18 of the tractor and having a manually operable lever 34 accessible to the operator's station 17. The manually operable lever 34 is connected to the rock-shaft 32 through a rearwardly extending connecting link 35, which is connected at its rear end to an arm 36 rigid with the rock-shaft 32. Extending rearwardly from the rock-shaft 32 are arms 37, 38, and 39, which are respectively connected, by means of lifting links 40, to the damming units 27, 28, and 29. The upper ends of these links 40 are connected to the arms 37, 38, and 39 by means of trunnions 41, the links themselves being slidable through the trunnions and having thereon adjustable set-collars 42 arranged to abut with the trunnions as the rock-shaft and its lifting arms are rocked forwardly to effect lifting movement of the units to the transport position shown in dotted lines in Figure 2. As the adjusting lever 34 is thrust forwardly to its position, as shown in dotted lines, the damming units will be lifted and the cultivating rigs pivoted about their respective pivotal connections on the rear portion of the tractor, whereby the units will be brought to a position of transport and out of contact with the ground.

Referring now particularly to Figure 3, there is shown a single self-contained unit having its attaching standard 44 of round shape and such that the same can be connected to the cultivating rigs by the same means 26 that the rig cultivating tools were attached to the respective rigs. The attaching means 26 includes a U-bolt 45 adapted to surround the standard 44 to clamp the same against a clamping part 46 to rigidly connect the unit to the respective rigs (see Figure 1).

The standard 44 has on its lower end a furrowing tool 47 adapted to form a furrow, as illustrated in Figure 4, and as the tractor traverses the field being cultivated. This furrow is indicated at 48 in Figure 4, in which there follows a damming element 49 serving to scrape dirt from the bottom and sides of the furrow 48 to build up earth within the furrow, as indicated at 50. When a sufficient amount of earth 50 has been provided to adequately dam the furrow 48, the damming element 49 is given a vertical motion by virtue of a camming element or projection 51 carried on rotatable wheels 52 which support a trailing frame 53 on which the damming element 49 is mounted. The forward end of the trailing frame 53 is pivotally connected to the unit standard 44 for limited lateral movement and in a manner shown more clearly in Figure 5. This trailing frame 53 includes laterally extending frame pieces 54 and 55, which are attached to the outer ends of a sleeve 56 by means of a bolt 57. This bolt 57 serves as a bearing, about which the frame 53 with its damming element 49 may pivot vertically. Rigid with the sleeve 56 is a vertically extending sleeve or socket 58 adapted to fit around the standard 44 at its lower end, so that it may pivot laterally, to thereby give the damming element 49 freedom to adapt itself within the furrow 48. In order to maintain the socket 58 vertically on the standard 44 and at the same time to limit the amount of lateral movement of the damming element 49, so that it may not readily leave the furrow and get out of alinement with the furrowing tool 47, there is provided a cap-screw 59 threaded into the standard 44, as indicated at 60. To effect the limiting movement of the socket 58, the socket has a slotted opening 61, through which the cap-screw 59 extends. When the end of the slot 61 of the socket 58 abuts the cap-screw 59, the lateral movement of the damming element 49 will be accordingly limited. In order to shield the opening 61, to prevent dirt from getting into the socket, there is provided on the cap-screw 59 a shielding plate 62.

The wheels 52 are journaled respectively on opposite ends of a transversely extending shaft 63 carried on depending brackets 64 connected respectively to the pieces 54 and 55 of the trailing frame 53. These wheels 52 are laterally spaced to such an extent that the wheels are more or less straddling the furrow 48 and so as not to break down the furrow walls.

Extending between the pieces 54 and 55 is a transversely extending member 65, through which extends a pressure spring rod 66 having a pressure spring 67 thereon, which reacts between the transverse piece 65 and set-collar 68 on the rod. The other end of the rod 66 is connected to a lug 69 on the upper end of the vertical standard 44. This pressure spring 67 will tend to keep the damming element 49 well within the furrow 48. This spring, however, is not so strong but that the damming element can be readily lifted. Also, by keeping the damming element in its proper position, the wheels 52 will likewise be kept at a proper contact with the ground to thereby provide proper measuring of the dams 50 within the furrow 48.

On the rearward end of the trailing frame 53 there is provided an upstanding lug 70, to which the rearward ends of the lifting rods 40 are attached, as indicated at 71. As the lifting of the units is effected, the trailing frames 53 carrying the damming units will be pivoted about their pivotal connection with the standards 44 until such time as the pressure spring 67 has been sufficiently compressed to prevent relative motion of the trailing frame with respect to the standard. Further movement of the lifting links 40 vertically will then be effected to lift the units completely out of their ground-working position.

It should now be apparent that a self-contained damming unit has been provided, which can be connected to regular cultivating equipment on tractors by a mere replacing of the same for the regular cultivating tool and standard which are used for ordinary cultivating purposes. The standard 44 of the unit is of the same round contour as the cultivating standard may well be, and thus the means 26 formerly used for connecting the cultivating tool standards is readily adaptable for connecting this self-contained damming unit. With this arrangement, it should now be apparent that water-collecting basins can be provided on the land at the time of cultivating as well as at the time the land is originally prepared. By this arrangement, water is collected and retained on the land at the time of year when it can do the most good.

While various changes may be made in the detail construction of the invention, it shall be understood that such changes shall be within the spirit and scope of the present invention as defined by the appended claim.

What is claimed is:

In a self-contained damming unit, a round vertical standard serving as means for attaching the unit to a tool-supporting structure, a furrowing tool connected to the standard, a damming tool adapted to follow in the furrow formed by the furrowing tool, and swivel socket means adapted to fit about the round standard for connecting the damming tool to the standard for limited lateral movement.

HIRAM P. SMITH.